United States Patent Office 3,192,156
Patented June 29, 1965

3,192,156
REMOVAL OF HYDROGEN SULFIDE
FROM WATER
Ronald S. Joyce, Pittsburgh, Pa., assignor to Pittsburgh Activated Carbon Company, a corporation of Pennsylvania
No Drawing. Filed Apr. 26, 1962, Ser. No. 190,265
7 Claims. (Cl. 210—63)

This invention relates to the removal of hydrogen sulfide from water.

It has been proposed previously in Shoemaker Patent 2,145,901 to remove hydrogen sulfide, iron and manganese from water by cementing manganese dioxide particles to a base of pumice, slag, coke, charcoal or zeolite. This procedure has the disadvantage that the product does not have a sufficiently high capacity for removal of the hydrogen sulfide and other contaminants of the water. Somewhat similar processes for removing hydrogen sulfide or soluble manganese and iron compounds from water are disclosed in Lawler Patent 2,355,808 and Zapffe Patent 1,990,214. Batchelor Patents 2,950,229, 2,950,230 and 2,950,231 and Gorin Patent 2,824,047 are also of interest in showing the use of manganese dioxide as a hydrogen sulfide acceptor.

Manganese treated zeolite has been employed commercially to remove hydrogen sulfide from water. It suffers from the following disadvantages:

(1) It has never performed satisfactorily on water containing over 10 p.p.m. of hydrogen sulfide.

(2) The high cost of the treatment has limited the use of manganese treated zeolite for hydrogen sulfide removal to domestic and small commercial units.

(3) The zeolite has only a small capacity for manganese dioxide.

(4) High hydrogen sulfide concentrations are frequently associated with hard water and softening is usually necessary. If a softener is used downstream from the sulfur removal unit, the hard water rapidly converts the manganese dioxide coated zeolite to the calcium form. In this form the zeolite has a tendency to "set" like concrete. On the other hand, if the softener is used upstream from the sulfur removal unit, manganese leakage from the latter may occur. Trace quantities of manganese in the purified water can lead to extremely severe staining of plumbing facilities.

It is an object of the present invention to develop an improved procedure for removal of hydrogen sulfide from water.

Another object is to remove soluble manganese and iron compounds from water.

A further object is to remove hydrogen sulfide from water containing over 10 p.p.m. of the hydrogen sulfide.

An additional object is to develop a method of removing hydrogen sulfide from water which eliminates the disadvantages associated with the use of manganese dioxide treated zeolite procedure.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by percolating the hydrogen sulfide containing water first through a bed of activated carbon impregnated with manganese dioxide to remove the hydrogen sulfide and then through a cation exchange water softener to remove water soluble manganese and iron compounds.

(In removing the hydrogen sulfide from the water at least a portion of the manganese dioxide is converted to water soluble manganous ions.)

It is critical that the activated carbon be impregnated with the manganese dioxide and not merely coated therewith to get the outstanding hydrogen sulfide removal which is attained by the present invention. In order to impregnate the activated carbon with manganese dioxide, it is not sufficient to merely add preformed manganese dioxide to the activated carbon. Instead, it is necessary to form the manganese dioxide in situ.

The manganese dioxide can be formed in situ on the activated carbon by passing an aqueous solution of an alkali metal permanganate, e.g., potassium permanganate or sodium permanganate, through the activated carbon. Alternatively, the activated carbon can be impregnated with an aqueous solution of manganous nitrate and heated to a temperature sufficiently high to decompose the nitrate to manganese dioxide. A third procedure is to impregnate the carbon with an aqueous solution of any soluble salt of divalent manganese, e.g., manganous sulfate or manganous chloride, and subsequently treat the impregnated carbon with an oxidizing agent, e.g., air or oxygen. By this procedure it is possible to impregnate the activated carbon with a large amount of manganese containing material in a very finely divided state. As a net result, the activated carbon not only has a higher capacity but there is a more rapid rate of oxidation than can be obtained with zeolites. Thus, the impregnated carbon can contain from 10 to 40% by weight total manganese material calculated as Mn and from 10 to 40% of manganese dioxide. Activated carbon containing smaller amounts of manganese dioxide can be used but does not have as high a capacity.

The manganese dioxide impregnated carbon will remove any concentration of hydrogen sulfide from the water from a fraction of one p.p.m. up to a concentrated solution of hydrogen sulfide.

The cation exchange water softener can be a synthetic or natural inorganic zeolite, sulfonated coal or a cation exchange resin such as sulfonated styrene-divinyl benzene copolymer, sulfonated phenol-formaldehyde resin or carboxylic acid resins such as ethylene glycol dimethacrylate-methacrylic acid copolymer. The cation exchange material is normally employed in the form of the sodium salt.

When the capacity of the manganese dioxide impregnated carbon for sulfide oxidation has been exhausted, the free sulfur can be removed from the bed by backwashing and the carbon can be regenerated by retreatment with alkali metal permanganate, e.g., potassium permanganate or sodium permanganate, or by retreatment with manganous nitrate or soluble manganous salts in the manner set forth above.

The manganese dioxide impregnated carbon is also useful to assist in the removal of manganese and iron from water by oxidizing their water soluble salts to insoluble oxide.

The activated carbon is generally between 4 and 325 mesh size but can be of larger or smaller size.

Unless otherwise indicated, all parts and percentages are by weight.

*Example 1*

Ninety-seven grams of Pittsburgh Type SGL activated carbon (12 x 30 mesh) were loaded into two 2 cm. internal diameter x 6 foot long vertical columns. This was sufficient carbon to give a three foot bed depth in each column. The columns were connected in series for downflow operation and 25 liters of a 1.9% potassium permanganate solution was pumped through the system at a flow rate of 50 ml./min. The system was then rinsed with water until a colorless effluent was obtained. Analysis of the permanganate concentration before and after treatment indicated that approximately one gram of permanganate per gram of carbon was consumed.

The activated carbon from the second column was removed and oven dried and the total manganese and manganese dioxide contents were determined. The values obtained were 13.3% Mn and 11.5% manganses dioxide.

A sufficient quantity of manganese treated inorganic zeolite (Nalcite FER) to obtain a three foot bed depth was added to a 2 cm. internal diameter x 6 foot long vertical column.

A dilute solution of hydrogen sulfide in water (average concentration 16 p.pm. hydrogen sulfide) was pumped through the first column of manganese dioxide impregnated activated carbon prepared in the first step of this example. Simultaneously, hydrogen sufide from the same reservoir was pumped through the manganese treated zeolite bed. After 70 hours of operation, 0.5 p.p.m. of hydrogen sulfide was detected in the effluent from the manganese treated zeolite column and after a total of 75 hours this had increased to 2.2 p.p.m. Hydrogen sulfide was not detected from the treated carbon bed until 300 hours of operation, when a concentration of 0.1 p.p.m. was noted. After a total of 316 hours, this value had increased only to 0.3 p.p.m.

After removal of the hydrogen sulfide by the bed of manganese dioxide impregnated activated carbon, the water was passed through a bed of sulfonated styrene-divinyl benzene co-polymer (Dowex 50) to remove any divalent manganese or iron present in the water.

*Example 2*

A 63 gram sample of the manganese dioxide impregnated carbon prepared in the second column described in step 1 of Example 1 was transferred to a 1.25 inch internal diameter x 9 inch deep column. This was sufficent impregnated carbon to give a 6 inch deep bed.

An aqueous solution of hydrogen sulfed (2.7% by weight or 27,000 p.p.m.) was percolated through the bed at a flow rate of 17 ml./min. No hydrogen sulfide was detected in the effluent until a volume of 1.88 liters had been collected. Up to this point the manganese dioxide impregnated column had removed 8.1% of its weight of hydrogen sulfide from solution.

The spent adsorbent was backwashed with tap water at a rate sufficient to obtain a 50% bed expansion, to remove the deposited sulfur. A volume of 4.7 liters of a 2.2% solution of potassium permanganate was percolated through the bed at a flow rate of 25 ml./min. Analysis of the potassium permanganate before and after the treatment showed that approximately 0.2 gram of potassium permanganate was used per gram of carbon in the impregnated adsorbent.

A 2.3% (23,000 p.p.m.) aqueous solution of hydrogen sulfide was percolated through the regenerated bed. After 2.38 liters of effluent had been collected, hydrogen sulfide was detected in the effluent. At this point the impregnated carbon had removed 7.8% of its weight of its weight of hydrogen sulfide from solution.

*Example 3*

The spent carbon from the last step of Example 2 was backwashed with water to remove the deposited sulfur, and one liter of a 5% aqueous sodium hypochlorite was percolated through the bed at a flow rate of 17 ml./min. The bed was rinsed with water.

A volume of 2.25 liters of a 2.4% (24,000 p.p.m.) hydrogen sulfide was percolated through the bed. After this volume had been collected, 4 p.p.m. of hydrogen sulfide were found in the effluent. Up to this point the impregnated adsorbent had removed 8.6% of its weight of hydrogen sulfide from solution.

The bed was backwashed with water, treated with 1.5 liters of 0.5% aqueous sodium hypochlorite solution, and rinsed with water.

A 3% (30,000 p.p.m.) aqueous solution of hydrogen sulfide percolated through the bed. After 500 ml. of effluent was collected, the concentration of hydrogen sulfide in the effluent was 17.5 p.p.m.

The spent carbon was analyzed for total manganese and manganese dioxide. Values of 15.8% Mn and 3.8% manganese dioxide were obtained.

Example 3 illustrates the fact that the impregnated activated carbon can be regenerated by the use of an oxidizing agent which will convert valence 2 or 3 manganese compounds to manganese dioxide.

*Example 4*

The pH of a 1.8% aqueous solution of potassium permanganate was adjusted to 11 by the addition of dilute aqueous sodium hydroxide. A volume of 3.5 liters of this solution was percolated through a 6 inch bed of Pittsburgh Type SGL activated carbon. The adsorbent was removed from the column and dried. The total manganese content was found to be 15.6% as Mn and the manganese dioxide content was 24.6%.

The impregnated carbon prepared in this manenr adsorbed 9.9% of its weight of hydrogen sulfide from a 1.9% (19,000 p.p.m.) aqueous solution to an 8 p.p.m. break point.

*Example 5*

A sample of previously prepared manganese dioxide impregnated activated carbon (Pittsburgh Type SGL) containing 11.6% of manganeses dioxide and 15.3% total manganese as Mn was pulverized in a ball mill. Two grams of the pulverized material was agitated for 18 hours with 100 ml. of a 5% aqueous solution of potassium permanganate. The slurry was filtered through a glass filter paper and the activated carbon was washed with a small amount of water and oven dried. The treated activated carbon had a manganese dioxide content of 39.2% and a total manganese content of 32.2% as Mn.

The thus prepared impregnated activated carbon was slurried with natural water containing 25 p.p.m. hydrogen sulfide and removed all the hydrogen sulfide therefrom. After treatment with the activated carbon, the water was passed through a sodium zeolite bed to remove soluble divalent manganese and iron salts.

*Example 6*

A sample of previously prepared manganese dioxide impregnated activated carbon which had been used for removal of hydrogen sulfide from water and which had a manganese dioxide content of 3.8% and a total manganese content of 13.3% as Mn was pulverized. A two gram sample of this was subjected to the same potassium permanganate treatment as employed in Example 5. The manganese dioxide content after treatment was 38.4% and the total manganese content was 36.2% as Mn.

The product of Example 6 was useful for removing hydrogen sulfide from water containing 2 p.p.m. of the hydrogen sulfide in the same manner as that described in Example 5.

I claim:

1. A process of removing hydrogen sulfide from water containing the same comprising passing the water through activated carbon particles impregnated with manganese dioxide which has been formed in situ.

2. A process according to claim 1 wherein the manganese dioxide has been formed by passing a potassium permanganate solution through the activated carbon.

3. A process according to claim 1 including the additional step of passing the water from which the hydrogen sulfide has been removed through a water insoluble cation exchange agent to remove iron and divalent manganese.

4. A process according to claim 1 including the additional steps of regenerating the activated carbon particles by (1) removing the sulfur deposited thereon by back washing with water and oxidizing the di- and trivalent manganese to manganese dioxide with an oxidizing agent and (2) treating the activated carbon with a manganese dioxide forming substance.

5. A process according to claim 4 wherein the manganese dioxide froming substance is an aqueous solution of potassium permanganate.

6. A process according to claim 1 wherein the water contains between 16 and 30,000 p.p.m. of hydrogen sulfide.

7. A process according to claim 1 wherein the activated carbon contains between 10 and 40% manganese dioxide.

References Cited by the Examiner

UNITED STATES PATENTS

| | | | |
|---|---|---|---|
| 1,750,561 | 3/30 | Adler et al. | 210—50 |
| 2,950,230 | 8/60 | Batchelor et al. | 202—31 |
| 2,979,157 | 4/61 | Clark | 252—184 |
| 3,017,347 | 1/62 | Kratz | 210—50 |

OTHER REFERENCES

Betz Handbook of Industrial Water Conditioning (5th Edition) (copyright, 1957 Betz Laboratories Inc.), pp. 23–25).

MORRIS O. WOLK, *Primary Examiner.*